(12) United States Patent
Shen et al.

(10) Patent No.: US 9,323,727 B2
(45) Date of Patent: Apr. 26, 2016

(54) METHOD AND SYSTEM FOR COMMUNICATING BETWEEN CLIENT PAGES

(71) Applicant: Alibaba Group Holding Limited, George Town (KY)

(72) Inventors: Jianping Shen, Hangzhou (CN); Hua Qiu, Hangzhou (CN)

(73) Assignee: Alibaba Group Holding Limited (KY)

( * ) Notice: Subject to any disclaimer, the term of this patent is extended or adjusted under 35 U.S.C. 154(b) by 243 days.

(21) Appl. No.: 13/939,870

(22) Filed: Jul. 11, 2013

(65) Prior Publication Data

US 2014/0019838 A1    Jan. 16, 2014

(30) Foreign Application Priority Data

Jul. 13, 2012    (CN) .......................... 2012 1 0244355

(51) Int. Cl.
  *G06F 17/00*    (2006.01)
  *G06F 17/22*    (2006.01)
  *H04L 29/08*    (2006.01)

(52) U.S. Cl.
  CPC ............ *G06F 17/2235* (2013.01); *H04L 67/14* (2013.01)

(58) Field of Classification Search
  CPC .................................................. G06F 17/2235
  See application file for complete search history.

(56) References Cited

U.S. PATENT DOCUMENTS

| | | | |
|---|---|---|---|
| 5,748,100 A * | 5/1998 | Gutman et al. ............... | 340/7.22 |
| 6,446,111 B1 * | 9/2002 | Lowery .......................... | 709/203 |
| 8,009,603 B2 * | 8/2011 | Lu et al. ........................ | 370/312 |
| 8,528,003 B2 * | 9/2013 | Everett-Church ............ | 719/313 |
| 2005/0229188 A1 | 10/2005 | Schneider | |
| 2008/0181158 A1 * | 7/2008 | Bouazizi et al. .............. | 370/312 |
| 2008/0295018 A1 * | 11/2008 | Nurmi et al. ................... | 715/780 |
| 2010/0146115 A1 * | 6/2010 | Bezos ............................ | 709/225 |
| 2011/0191431 A1 | 8/2011 | Noguchi | |
| 2012/0036431 A1 * | 2/2012 | Ito et al. ......................... | 715/273 |
| 2012/0165076 A1 * | 6/2012 | Yu et al. ......................... | 455/566 |
| 2014/0079036 A1 * | 3/2014 | Montojo et al. ............... | 370/336 |

FOREIGN PATENT DOCUMENTS

| | | |
|---|---|---|
| EP | 2421226 | 2/2012 |
| JP | 2000020357 | 1/2000 |
| JP | 2000267964 | 9/2000 |
| JP | 2002182971 | 6/2002 |
| JP | 2011065439 | 3/2011 |

\* cited by examiner

*Primary Examiner* — Laurie Ries

(74) *Attorney, Agent, or Firm* — Van Pelt, Yi & James LLP

(57) ABSTRACT

Embodiments of the present application relate to a method for communicating between pages to be displayed at a client, a system for communicating between pages to be displayed at a client, and a computer program product for communicating between pages to be displayed at a client. A method for communicating between pages to be displayed at a client is provided. The method includes detecting whether a first page is to transmit data to a second page, in the event that the first page is to transmit the data to the second page, obtaining a communication identifier of the second page in a current page group storing the first page and the second page, and establishing a communication link between the first page and the second page based on the communication identifier, and using the communication link to send the data to be transmitted to the second page.

19 Claims, 15 Drawing Sheets

200

METHOD AND SYSTEM FOR COMMUNICATING BETWEEN CLIENT PAGES

CROSS REFERENCE TO OTHER APPLICATIONS

This application claims priority to People's Republic of China Patent Application No. 201210244355.6 entitled A METHOD AND DEVICE FOR COMMUNICATION BETWEEN CLIENT PAGES, filed Jul. 13, 2012 which is incorporated herein by reference for all purposes.

FIELD OF THE INVENTION

The present application relates to a method and a system for communicating between client pages.

BACKGROUND OF THE INVENTION

Typically, a plurality of web pages displayed in a browser on a client device cannot directly communicate among themselves. Because one page generally cannot directly communicate with another page, transmitting data directly among the plurality of pages is generally not possible.

For example, three approaches to indirectly updating data are as follows:

The first approach to updating data is to use localstorage of HTML5. In other words, the browser obtains update data from a server. Then the browser transmits the obtained update data to each of the browser's own pages to be updated. Currently, many browsers do not support localstorage, and different browsers are unable to communicate with each other. Because different browsers obtain the update data based on different time cycles, page updating is usually not synchronized between the various browsers.

The second approach to updating data is a JavaScript (JS) polling approach. In this approach, the client acquires update data from the server. Each page regularly polls the server to inquire whether there is new data. To ensure the timeliness of the page data, the polling time is set to be as short as possible. The shorter the polling time is set to be, the greater the impact on the function of the page, and the greater the number of pages to be polled, the greater the effect to the whole system. If the server data has been changed but the page did not timely request an update, the accuracy of the page will be affected.

The third approach to updating data is, for each page, establishing a long link with the server. The long link is also known as an HTTP Persistent Connection, an HTTP keep-alive, or an HTTP connection reuse. The long link is capable of using the same TCP connection to send and receive multiple HTTP requests/responses. Otherwise, a new TCP connection must be opened for every single request/response pair. Although the use of long links helps increase HTTP performance and ensures immediacy, the approach wastes bandwidth resources because a large number of pages may be transferred to and from the server.

Accordingly, direct communications between client pages would be beneficial.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
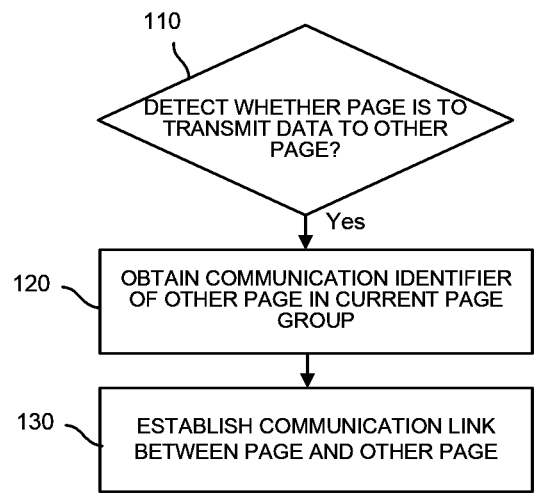
FIG. 1 is a flowchart of an embodiment of a communication between pages process.

FIG. 1 is a flowchart of an embodiment of a communication between pages process. The process 100 can be implemented by a client 1310 of FIG. 13 and includes:

In 110, the client detects whether a page is to transmit data to another page.

The data that is to be transmitted to the other page varies according to different applications of inter-page communication. In one example, in the event that a page is to be updated, update data will be transmitted to the page requesting the update. In another example, in the event that synchronous page operations are to be performed, operational data that orders a new operation is what will be transmitted from one page to another page. An explanation is provided with specific applications.

In 120, in the event that the page is to transmit the data to the other page, the client obtains a communication identifier of the other page in a current page group as stored by the page.

In some embodiments, page groups are pre-established groups of pages. Each group has at least two pages. Communication identifiers are allocated to each page in each page group when the page groups are established. Each page in each page group stores the communication identifiers for the other pages in the each page group. These communication identifiers are identifiers used to uniquely identify each page. In some embodiments, identifiers are generated according to a preset rule. For example, the identifier of the first page is page_1, the identifier of the second page is page_2, etc. In some embodiments, communication links are established between pages based on the communication identifiers. For example, if the page identifier is page_1, a communication link is comm_page_1, etc. In some embodiments, the page identifier corresponds to the communication link and when pages communicate with each other, communications are performed using a communication link.

In some embodiments, page groups are created. For example, a plurality of pages that are opened based on one web address are set up as a page group for synchronous updating of the plurality of pages. In some embodiments, a single page group including pages corresponding to the same user is set up based on web sites the user has accounts for, for example, a user's profile/personal pages on social networking sites such as QQ (Qzone™), microblog sites such as Tencent Weibo or Sina Weibo. Accordingly, a Qzone page signature and other messages are synchronously updated with the microblog pages. Page groups can be set up in any way as understood by one of ordinary skill.

Since page groups are established based on different criteria, the same page may belong to a plurality of page groups. Therefore, in the event a transmission of data is detected, the current page group based on attribute information of the data is also determined. In some embodiments, the page group is named, for example, rain_group, cloud_group, etc. The detected data is then transmitted between the pages of the current page group.

In some embodiments, the attribute information of data is typically transmission attribute information of the data. In some embodiments, a plurality of pages form a group, such as, for example, a group named cloud and the group's pages include cloud_page_host, cloud_page_1, cloud_page_2, etc. The cloud_page_host is responsible for sending data and the other pages of the group receive the data. When the data changes, the changed data is sent via the host page to the other pages. For example, in the event that data is signature messages displayed in Qzone or microblogs, the current page group is the page group including Qzone and microblog pages. In the event that data is to be transmitted between same origin pages, the current page group is the page group comprised of same origin pages.

In 130, the client establishes a communication link between the page and the other page based on the communication identifier, and uses the communication link to send the data to be transmitted to the other page.

Figure 2:
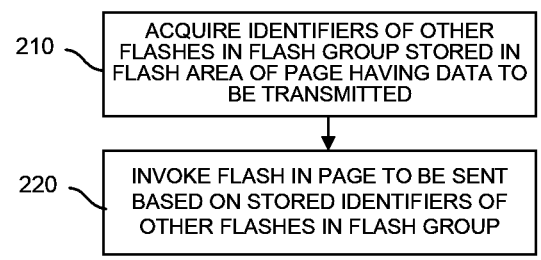
FIG. 2 is a flowchart of an embodiment of an establishment of communication links process.

FIG. 2 is a flowchart of an embodiment of an establishment of communication links process. In some embodiments, the process 200 is used to implement 130 of process 100 and comprises:

In 210, the client acquires identifiers of other FLASH files in a FLASH group stored in a FLASH area of a page having data to be transmitted. The FLASH group includes FLASH files corresponding to pages in the current page group. A FLASH area of each page stores the identifiers of the other FLASH files in the FLASH group. FLASH refers to Adobe Flash.

In 220, the client invokes a FLASH file in the page to be sent based on the stored identifiers of other FLASH files in the FLASH group. The invocation of the FLASH file includes sending a message receive request including the data to be transmitted to the other FLASH files. FLASH is used to create a group, each group member is a swf file created by Flash, and data is synchronized among members within the group. The swf file is in the Adobe Flash format.

The other FLASH files receive the message receive request to acquire the data.

In some embodiments, clients also use other units in the page with data transmission functions for inter-page transmission of the data based on the communication identifiers.

Figure 3:
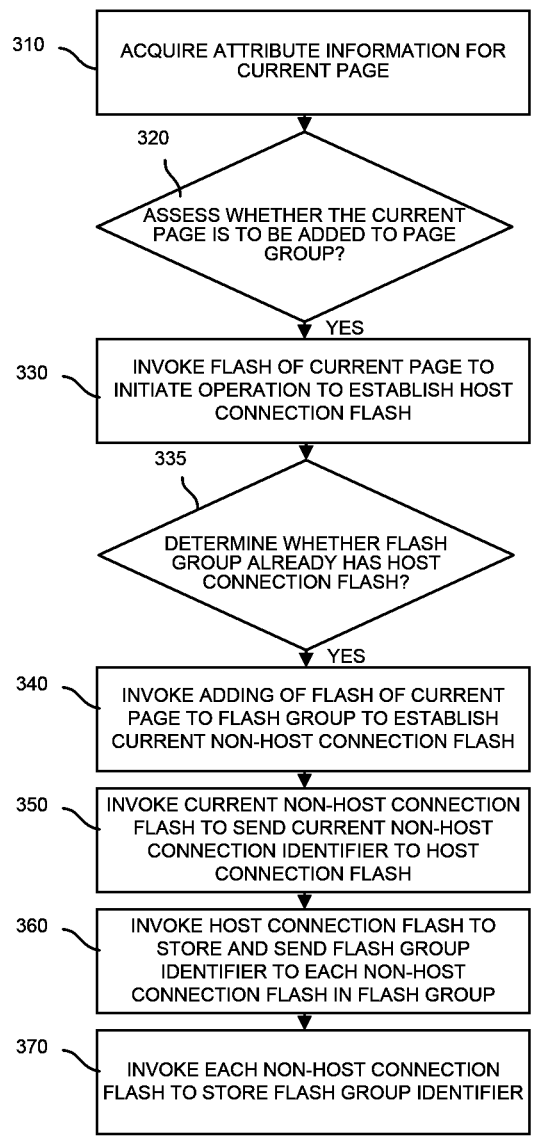
FIG. 3 is a flowchart of another embodiment of a communication between pages process.

FIG. 3 is a flowchart of another embodiment of a communication between pages process. The process 300 can be implemented by a client 1310 of FIG. 13 and includes:

In 310, the client acquires attribute information for a current page.

In some embodiments, "current page" refers to a currently opened page detected by a client. In the event that a page is opened, the client acquires attribute information for the page. The "attribute information" relates to information used to represent whether the page is to communicate with other pages and what communication is to be performed for which pages. For example, the client determines whether the page has been set up for synchronous updating with another page, determines whether the page has been set up for synchronous operation with the other page, determines types of data for synchronous updating, determines types of operations for synchronous operations, etc. In some embodiments, the same page is added to a plurality of page groups based on different attributes of the page. For example, a page joins a cloud group, and the page is identified as cloud_page_1. At the same time, the same page joins a rain group, and the page is also identified as rain_page_1. The same page can also join additional groups. Each group is responsible for keeping one type of data synchronized. For example, the cloud group is responsible for keeping data synchronized, and the rain group is responsible for keeping state synchronized.

In 320, the client assesses whether the current page is to be added to a page group based on the attribute information.

For example, in the event that the attribute information indicates that the current page A is to undergo signature message synchronous updating with another page B, the client assesses that the current page A is to be added to a corresponding page group.

In some embodiments, synchronous updating between same origin pages is the default requirement of current networks. In other words, each page is to be synchronously updated with another same origin page. Therefore, each page is to be added to the page group for same origin page synchronous updating. In some embodiments, the origin page represents the group's host page, and the origin page is responsible for synchronizing the other pages with data the origin page received.

In 330, in the event that the current page is to be added to a page group, the client invokes a FLASH file of the current page to initiate an operation to establish a host connection FLASH file. For example, using a group named cloud, the name of the group's host is cloud_page_host. The group's host is responsible for keeping data synchronized among the group members.

In some embodiments, one client sets up a plurality of page groups. In some embodiments, FLASH groups corresponding to page groups are differentiated by names given by the user. In some embodiments, the user names the group at the time the group is established. No restriction to the specific names the page groups are given exists. For example, the page groups are called "cloud," "rain," etc. In addition, the same page can be added to a plurality of different page groups. Therefore, the same page might have different FLASH files invoked. In order to differentiate the different FLASH files to be invoked, each of the various FLASH files for one page is set up based on the corresponding FLASH group name. For example, the name of a host connection FLASH file could be set up as "FLASH group name_HOST." Thus, the name signifies the FLASH group where the host connection FLASH file is located.

In some embodiments, in the event that a page is launched, the client invokes the "create" interface to initiate an operation that attempts to create a host connection FLASH file. In the event that the FLASH group name is "cloud," the host connection name is "cloud_HOST."

In 335, the client determines whether the FLASH group already has a host connection FLASH file.

In some embodiments, if a group does not have a host, the first group member to designate themselves as the host becomes the group host. So, the host almost always exists.

In 340, in the event that the FLASH group already has the host connection FLASH file, the client invokes adding of the FLASH file of the current page to the FLASH group to establish a current non-host connection FLASH file and at substantially the same time generates and records a current non-host connection identifier.

In some embodiments, only one host connection FLASH file exists. In some embodiments, a plurality of non-host connection FLASH files exist. To differentiate non-host connection FLASH files from each other, non-host connection identifiers that are generated are unique.

Figure 4:
FIG. 4 is a flowchart of an embodiment of a generation of a current non-host connection identifier process.

FIG. 4 is a flowchart of an embodiment of a generation of a current non-host connection identifier process. In some embodiments, the process 400 is used to implement 340 of process 300 and includes:

In 410, the client invokes a "join" interface to create a non-host connection FLASH file with the name "FLASH group name_non-host-connection identifier A." In the event that the identifier A already exists, the client attempts to create a non-host connection FLASH file with the name "FLASH group name_non-host connection identifier B," etc. until the created identifier does not exist in the FLASH group.

In some embodiments, non-host connection identifiers are generated randomly. In some embodiments, the non-host connection identifiers are generated according to a sequence.

In 350, the client invokes the current non-host connection FLASH file to send the current non-host connection identifier to the host connection FLASH file.

In 360, the client invokes the host connection FLASH file to store and send the FLASH group identifier to each non-host connection FLASH file in the FLASH group. The FLASH group identifier includes the host connection identifier and each non-host connection identifier.

In 370, the client invokes the each non-host connection FLASH file to store the FLASH group identifier.

In some embodiments, in the event that the FLASH group includes only the host connection FLASH file and the current non-host connection FLASH file, the FLASH group identifier includes the host connection identifier and the current non-host connection identifier, and "each non-host connection" relates to the current non-host connection FLASH file.

In the event that the FLASH group includes the host connection FLASH file, the current non-host connection FLASH file, and other non-host connection FLASH files, the FLASH group identifier includes the host connection identifier, the current non-host connection identifier, and non-host connection identifiers of the other non-host connection FLASH files, and "each non-host connection" relates to the current non-host connection FLASH file and other non-host connection FLASH files.

In the event that the current FLASH group does not have a host connection FLASH file, the client establishes the invoked FLASH file as the host connection FLASH file and, at the same time, the host connection identifier is generated and recorded. In the event that the FLASH group has at least one non-host connection FLASH file, the client invokes each non-host connection FLASH file in the FLASH group to send a non-host connection identifier to the host connection FLASH file.

In some embodiments, the client invokes the host connection FLASH file to send the FLASH group identifier to the each non-host connection FLASH file. The FLASH group identifier includes the host connection identifier and each non-host connection identifier.

In some embodiments, the client invokes each non-host connection FLASH file to store the FLASH group identifier.

The FLASH communication mechanism is established through at least one of the above processes. The FLASH area stores the identifier of any FLASH file in the FLASH group and thus provides the conditions for subsequent communications. In the above processes, the host connection FLASH file performs the role of a server and is used to establish communications between the various non-host connection FLASH files.

In some embodiments, the host connection FLASH file stops working. For example, in the event that the page corresponding to the host connection FLASH file is closed, the host connection FLASH file disappears with the page. In the event that a new non-host connection FLASH file is subsequently established, in some cases, joining the FLASH group is not possible.

Subsequently, any non-host connection FLASH file in the FLASH group is invoked to re-establish the host connection FLASH file. In the event that the host connection FLASH file becomes invalid, the non-host connection FLASH file, whereby the establishment of the host connection FLASH file was re-initiated, is established as the new host connection FLASH file and at substantially the same time a new host connection identifier is generated and recorded. In some embodiments, this process is performed in real time. In some embodiments, this process is performed periodically. In some embodiments, the generated new host connection identifier is the same as the original host connection identifier.

The new host connection FLASH file is invoked to update the self-stored FLASH group identifier based on the new host connection identifier, and the updated FLASH group identifier is sent to each non-host connection FLASH file in the FLASH group.

After the new host connection FLASH file is generated, the client invokes the new host connection FLASH file to update the group members, deletes the identifier which existed when the host connection FLASH file was a non-host connection FLASH file, updates the self-stored FLASH group identifier according to a new host connection identifier, and then sends the updated FLASH group identifier to all non-host connection FLASH files of the current FLASH group.

The each non-host connection FLASH file is invoked to use the received, updated FLASH group identifier as a basis for updating the FLASH group identifier which was self-stored.

FIGS. 5-8 are diagrams of an embodiment of an establishment of a host connection FLASH file and non-host connection FLASH files process.

In a specific application, four pages A, B, C and D are to undergo synchronous updating. Therefore, a page group is established relating to the four pages A, B, C and D. The name of the FLASH group correspond to the page group is set up as "cloud." Each FLASH file has the same content.

Figure 5:
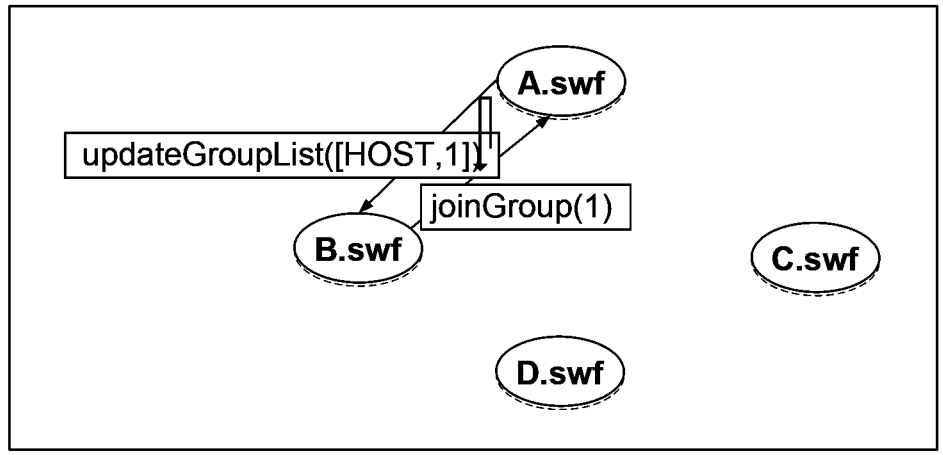
FIGS. 5-8 are diagrams of an embodiment of an establishment of a host connection FLASH file and non-host connection FLASH files process.

First, as shown in FIG. 5, page A is opened, and the corresponding FLASH file is invoked. The FLASH file first tries to invoke the "create" interface to establish a local connection with the name "cloud_HOST." Because the FLASH group still does not have a host connection, the attempt to establish the local connection succeeds, and the host connection identifier is recorded as HOST. The FLASH file is the host connection FLASH file, which performs the role of server.

Next, page B is opened, and the corresponding FLASH file is invoked. The FLASH file first tries to invoke the "create" interface to establish a local connection with the name "cloud_HOST." Because the FLASH group already has a host connection, the attempt to establish the local connection fails. At this point, the "join" interface is invoked to establish a non-host connection FLASH file and adds the non-host connection FLASH file corresponding to page B to the group. With the "join" interface invoked, the FLASH file tries to create a local connection with the name "cloud_1." Since the FLASH group does not have the same name as the local connection, the attempt succeeds, and the successful ID is recorded as 1. Next, the client invokes the non-host connection FLASH file to send a join group request carrying the client's ID of 1 to the host connection FLASH file. The host FLASH file receives the request and stores the ID, namely 1, which the host includes and generates a FLASH group identifier (HOST, 1). Then the host FLASH file sends an update request including the FLASH group identifier (HOST, 1) to the non-host connection FLASH file corresponding to page B. Upon receiving the host FLASH file's update request, the non-host connection FLASH file records the FLASH group identifier (HOST, 1).

Figure 6:
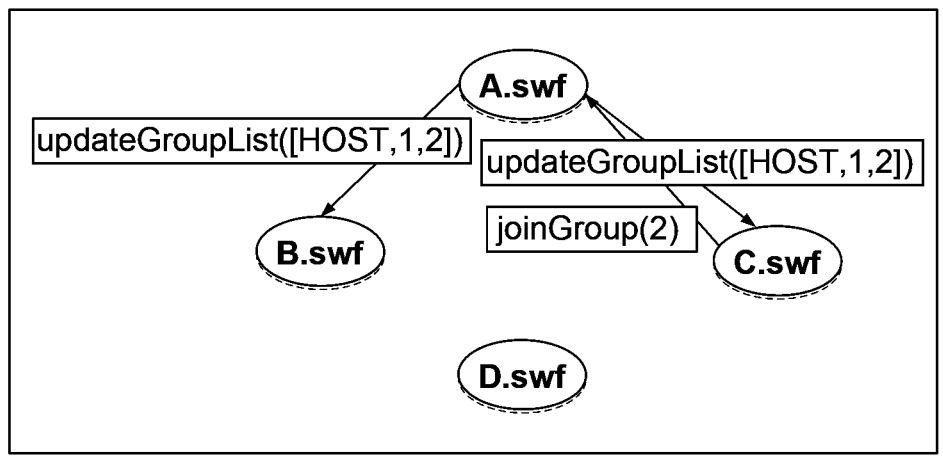

Next, page C is opened, and the corresponding FLASH file is invoked. The FLASH file first attempts to invoke the "create" interface to establish a local connection with the name "cloud_HOST." Because the FLASH group already has a host connection, the attempt to establish the local connection fails. At this point, the "join" interface is invoked to establish a non-host connection FLASH file and adds the non-host connection FLASH file corresponding to page C to the group. The FLASH file now tries to create a local connection with the name "cloud_1." Since the FLASH group already has this name, the attempt to create the local connection fails. The FLASH file now makes another attempt and establishes a local connection with the name "cloud_2" and records the successful ID as 2. As shown in FIG. 6, next, the client invokes the non-host connection FLASH file to send a join group request including its own ID of 2 to the host connection FLASH file. The host FLASH file receives this request and stores the ID, namely 2, and generates a FLASH group identifier (HOST, 1, 2). Then the host FLASH file sends update requests including the FLASH group identifier (HOST, 1, 2) to the non-host connection FLASH files corresponding to pages B and C. Upon receiving the host FLASH file update request, the non-host connection FLASH file corresponding to page B updates its self-stored FLASH group identifier to (HOST, 1, 2), and the non-host connection FLASH file corresponding to page C stores the FLASH group identifier (HOST, 1, 2).

Figure 7:
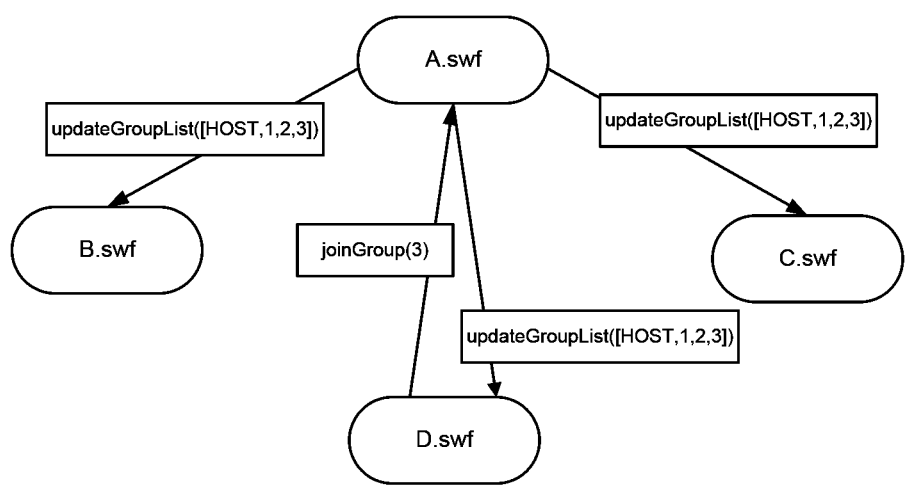

Next, page D is opened, and the corresponding FLASH file is invoked. The FLASH file first attempts to invoke the "create" interface to establish a local connection with the name "cloud_HOST." Because the FLASH group already has a host connection, the attempt to establish the local connection fails. At this point, the "join" interface is invoked to establish a non-host connection FLASH file and add the non-host connection FLASH file corresponding to page D to this group. The FLASH file now attempts to establish a local connection with the name "cloud_1." Since the FLASH group already has this name, the attempt to establish the local connection fails. The FLASH group now makes another attempt to establish a local connection with the name "cloud_2" and record the successful ID of 2. Since the FLASH group already has this name, the attempt to establish the local connection fails. The FLASH group now makes another attempt to establish a local connection with the name "cloud_3." The attempt to establish the local connection succeeds, and the successful ID is recorded as 3. As shown in FIG. 7, next, the client invokes the non-host connection FLASH file to send a join group request including its own ID of 3 to the host connection FLASH file. The host FLASH file receives the join group request and stores the ID of 3, included therein and generates a FLASH group identifier (HOST, 1, 2, 3). Then the host FLASH file sends update requests including the FLASH group identifier (HOST, 1, 2, 3) to the non-host connection FLASH files corresponding to pages B, C and D. Upon receiving the host FLASH update request, the non-host connection FLASH files corresponding to pages B and C update their self-stored FLASH group identifier to (HOST, 1, 2, 3), and the non-host connection FLASH file corresponding to page D stores the FLASH group identifier (HOST, 1, 2, 3).

Generally, when new pages are opened, the client invokes FLASH files corresponding to the new pages to successively execute the following: to establish the host connection FLASH file and non-host connection FLASH files, to send their own identifiers to the host connection FLASH file, and to receive the FLASH group identifier.

In addition, after the FLASH files corresponding to pages B, C and D successfully establish non-host connection FLASH files, the FLASH files use the unique characteristics of the host connection to, at regular time intervals, become the host connection FLASH file. In the event that page A has not been closed, the host connection FLASH file remains valid. Therefore, this operation will fail.

Figure 8:
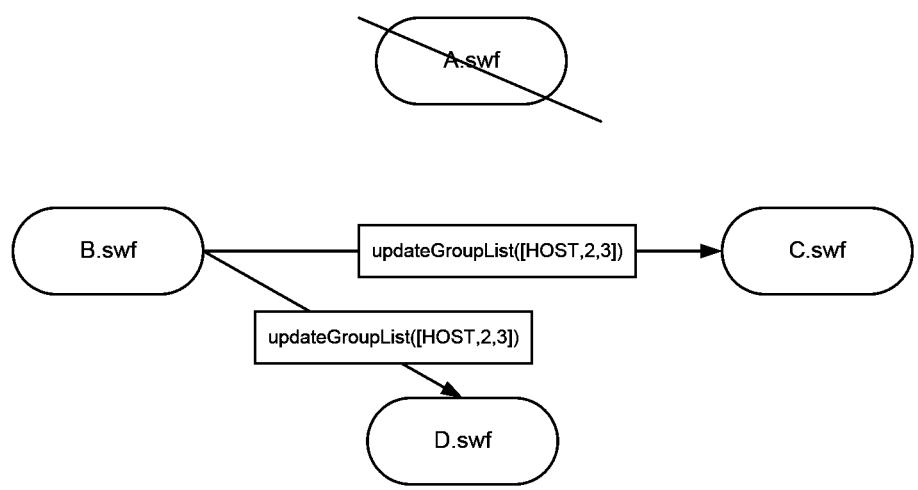

As shown in FIG. 8, at a certain point in time, page A is closed, and the host connection FLASH file disappears. At this time, the FLASH file of page B initiates the establishment of a host connection FLASH file. Therefore, the initiation of the establishment of the host connection FLASH file succeeds, and the non-host connection FLASH file corresponding to page B becomes the new host connection. At substantially the same time, a new host connection identifier is generated, and the new host connection identifier is also set as HOST, the same as the original host connection identifier. Then the new host connection FLASH file is invoked to update the group members. The original host connection identifier is deleted from the FLASH group identifier, and the host connection identifier of 1 is changed to the original host connection identifier HOST and the self-stored FLASH group identifier is updated to (HOST, 2, 3). Then the update request including the updated FLASH group identifier is sent to the non-host connection FLASH files corresponding to pages C and D. After the non-host connection FLASH files corresponding to pages C and D receive the update request, the non-host connection FLASH files corresponding to pages C and D update their self-stored FLASH group identifier to (HOST, 2, 3).

Through the above process, each FLASH file in the FLASH group stores the identifiers of all the FLASH files in the FLASH group. Communication is established among the various FLASH files based on the identifiers that each FLASH file stores.

The above direct communications between client pages has many applications. Examples of the direct communications between client pages include being applied to synchronous updating between pages and synchronous operations between pages as described below.

Figure 9:
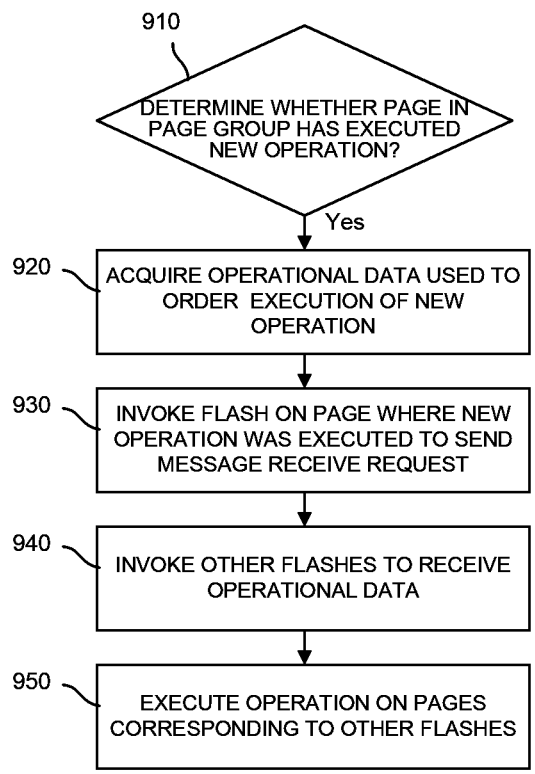
FIG. 9 is a flowchart of an embodiment of a communication between pages process.

FIG. 9 is a flowchart of an embodiment of a communication between pages process. The process 900 can be implemented by a client 1310 of FIG. 13 and includes:

In 910, the client determines whether a page in a page group has executed a new operation.

In some embodiments, "new operation" refers to page-related operations (for example, page switching) other than the updating of contents.

In 920, in the event that the page in the page group has executed the new operation, the client acquires operational data used to order the execution of the new operation.

In 930, the client invokes the FLASH file on the page where the new operation was executed to send a message receive request including the operational data to the other FLASH files based on the stored identifiers of the other FLASH files in the FLASH group.

In 940, the client invokes the other FLASH files to receive the operational data based on the message receive request.

In operations 930 and 940, in some embodiments, a FLASH file is invoked through the page's JS.

In 950, the client executes the operation on pages corresponding to the other FLASH files based on the operational data.

Many options in which a FLASH file can send a message receive request to other FLASH files and in which the other FLASH files receives operational data based on the message receive request exist. In some embodiments, a sendmessage send message function and a receivemessage receive message function within a FLASH file is used for message sending and message receiving.

Figure 10:
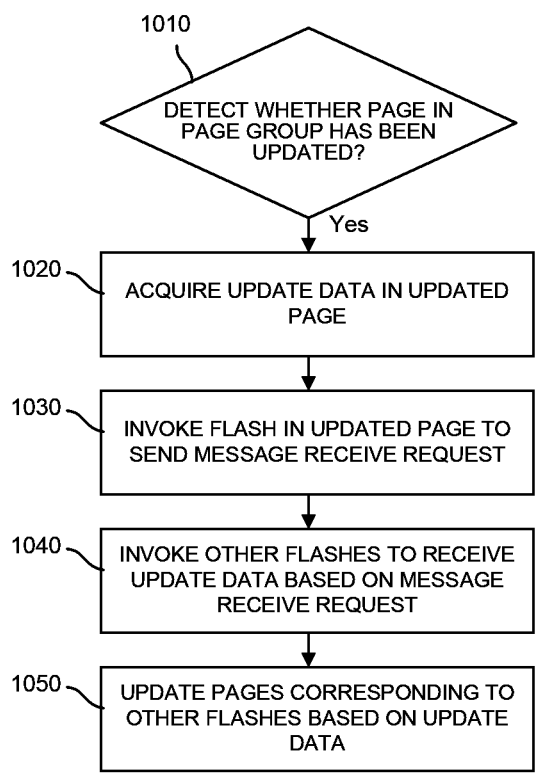
FIG. 10 is a flowchart of an embodiment of a synchronous updating process.

FIG. 10 is a flowchart of an embodiment of a synchronous updating process. The process 1000 can be implemented by a client 1310 of FIG. 13 and comprises:

The process 1000 will be introduced using an example of page switching.

The client establishes a page group including pages A, B and C. Page A of the page group is switched from a first sub-page to a second sub-page at a certain point in time. After the client detects a new operation, the page acquires the operational data, for example, "1, 2," used to order the operation of switching from the first sub-page to the second sub-page on the page. Subsequently, the client invokes the FLASH file in page A to establish a communication process with pages B and C based on the stored identifiers for the FLASH files corresponding to pages B and C. The sendmessage function is used to send the receivemessage request including operational data to the FLASH files of pages B and C. The client invokes the FLASH files of pages B and C to use the receivemessage function to receive the receivemessage request and to acquire the operational data included in the page: "1, 2." The client uses the operational data to execute the operation of switching from the first to second sub-pages on pages B and C.

In 1010, the client detects whether a page in a page group has been updated.

In 1020, in the event that the page in the page group has been updated, the client acquires update data in the updated page.

In 1030, the client invokes the FLASH file in the updated page to send a message receive request including the update data to the other FLASH files in the FLASH group based on the stored identifiers of the other FLASH files.

In 1040, the client invokes the other FLASH files to receive the update data based on the message receive request.

In 1050, the client updates the pages corresponding to the other FLASH files based on the update data.

As can be seen in the above process 1000, a page in the page group is to undergo updating before the updated page is used to transmit the update data to other pages. In some embodiments, the page that previously undergoes updating acquires the update data in the following three approaches:

A first approach is a browser-based local storage solution. In this approach, a browser is set up to acquire update data from a server. Subsequently, the update data is sent to at least one page in the browser where the at least one page is updated. Because the first approach involves only one browser, the pages in other browsers are updated based on the direct communication between pages, as described above. Therefore, this approach allows the browser-based local storage solution to span different browsers during page updating.

A second approach involves page polling. In this approach, the client acquires update data from a server. The client is set up for periodic page polling and acquires the update data from the client to perform updating. In this approach, since only one page is involved, immediacy and page performance are assured. Also, in this approach, setting up a polling client for an appropriate quantity of pages is possible. Once a quantity of pages is set up, page performance can be assured.

The third approach is based on server long links. A page server long link is set up, and update data is acquired from the server to carry out updating. Since only one page has a long link with the server in this approach, less bandwidth demand on the server exists and thus server costs are lower. Of course, in this approach, setting up server long links with an appropriate quantity of pages within the server's bandwidth limits is also possible.

In this embodiment, the FLASH files in a FLASH group may have the same file content, such as FLASH files for a plurality of same origin pages opened with the same web address. Of course, each FLASH file may also have different content as, for example, the FLASH files for the Qzone and microblog pages of one user.

In some embodiments, the type of update data to be transmitted varies according to different updating desires. For example, because each update is to be synchronized when synchronous updating occurs between same origin pages, the "update data" refers to any update data on the page. In some embodiments, when only a specific update is to be synchronized, the update data is only specific data of a certain type, for example, the aforementioned Qzone and microblog pages of one user. The only data that is detected on the page in this case is signature data, and not other data. Accordingly, setting up specific types for update data in order to satisfy different updating desires is possible.

The following example is an application scenario of synchronous updating via communication between same origin pages.

Three identical pages A, B and C are opened based on three clicks of the same forum web address by a user. The three pages are added to the same page group. The FLASH files corresponding to the three pages constitute a FLASH group. Each FLASH file has the same file content, and all of the FLASH files store identifiers of other FLASH files in the FLASH group.

Another user on the forum publishes the message "It will rain today." In this example, the forum establishes a group.

The client acquires the published message. After page A acquires this message through a certain approach, such as one approach of the aforementioned three approaches, page A updates its own page. At this point, page A displays the message "It will rain today."

The client detects that page A has been updated and thereupon obtains update message "It will rain today" from page A.

The client invokes the FLASH file of page A to send a message receive request including the message "It will rain today" to the FLASH file of page B based on the self-stored identifier for the page B FLASH file. At substantially the same time, the client invokes the FLASH file of page A to send a message receive request including the message "It will rain today" to the FLASH file of page C based on the self-stored identifier for the page C FLASH file.

The client invokes the FLASH files of pages B and C to receive the message receive requests and to acquire the "It will rain today" message included in the requests.

The client displays the "It will rain today" message on pages B and C.

Pages A, B and C have now undergone synchronous updating.

The following example is a specific application scenario of synchronous updating via communication between different origin pages.

A user opens his own Qzone page and Tencent microblog page and synchronizes the Qzone page signature message with the Tencent microblog page.

The client adds the Qzone page and the Tencent microblog page to the same page group. The Qzone page FLASH file stores an identifier for the Tencent microblog page FLASH file, and the Tencent microblog page FLASH file stores an identifier for the Qzone page FLASH file.

When the user modifies the signature message to "It will rain today," the Qzone page uses one of the aforementioned three approaches to acquire the message and displays the message on its own page.

The client detects that the Qzone page signature message has been updated and thereupon acquires the signature message.

The client invokes the FLASH file of the Qzone page to send a message receive request including the update data "It will rain today" to the Tencent microblog page FLASH file based on the stored identifier for the Tencent microblog page FLASH file.

The client invokes the Tencent microblog page FLASH file to receive the message receive request and to acquire the "It will rain today" update data included in the message receive request.

The client displays "It will rain today" on the Tencent microblog page.

The Qzone page and the Tencent microblog page have now undergone synchronous updating.

Next, the user adds the note "It hasn't rained yet" on the Qzone page.

The client detects that the Qzone page has been updated, but the update message is not a signature message. Thus, this update message is not acquired.

In the above example, in the synchronous inter-page operations, the page FLASH file uses the sendmessage function and the receivemessage function for sending and receiving update data.

Figure 11:
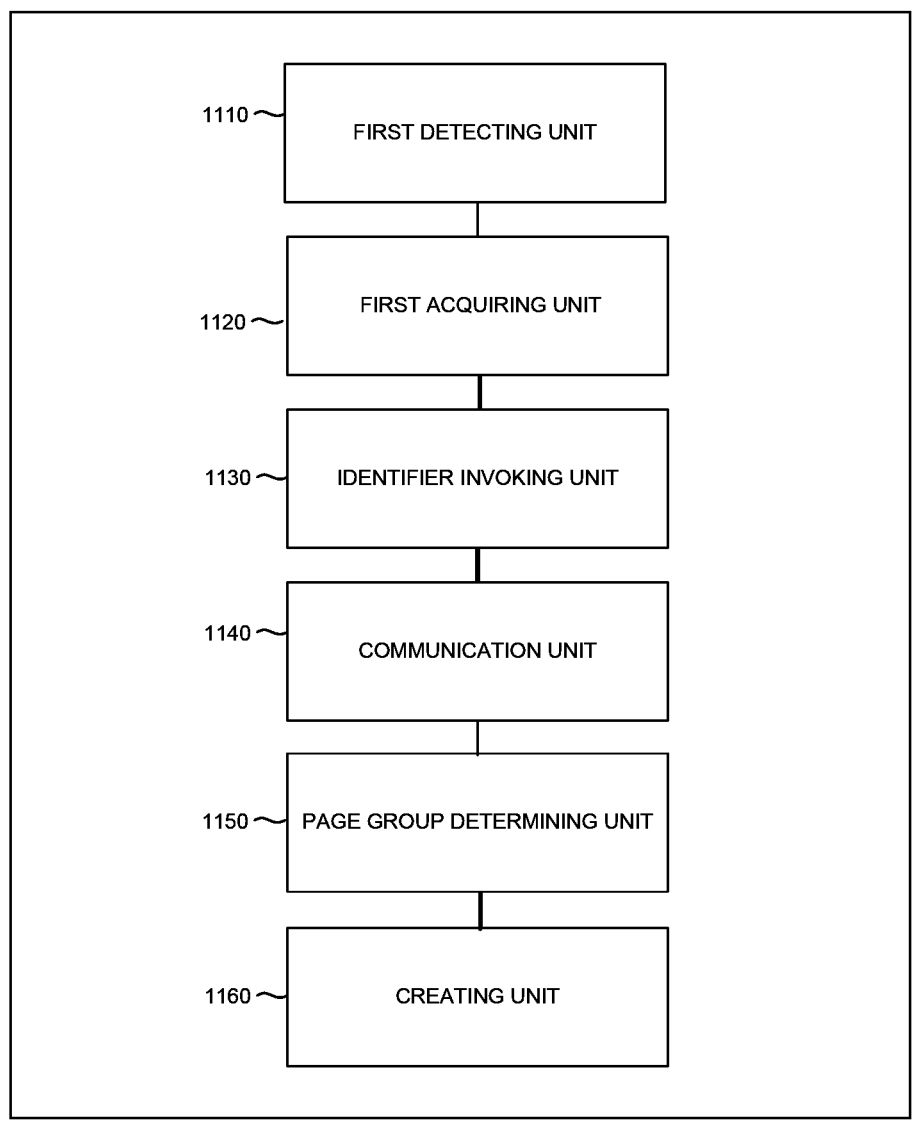
FIG. 11 is a structural diagram of an embodiment of a device for communicating between pages.

FIG. 11 is a structural diagram of an embodiment of a device for communicating between pages. The device 1100 comprises a first detecting unit 1110, a first acquiring unit 1120, an identifier invoking unit 1130, and a communication unit 1140.

The first detecting unit 1110 determines whether a page is to conduct data transmissions with another page.

The data to be transmitted between pages varies according to differences in specific applications of inter-page communications. For example, in the event that a page is to be updated, update data for updating pages is to be transmitted. In the event that synchronous page operations are to be performed, operational data used to order new operations is to be transmitted, as described below.

The first acquiring unit 1120 acquires data in the event that the page has data to be transmitted.

The identifier invoking unit 1130 obtains communication identifiers of other pages in a current page group as stored by the page.

In some embodiments, page groups are pre-established combinations of at least two pages. A communication identifier is allocated to each page in the page groups when the page groups are established. Each page in the page group stores communication identifiers for the other pages in the page group. These communication identifiers are identifiers used to uniquely identify each page. In some embodiments, communication links are established between pages based on the identifiers.

In some embodiments, page groups are created as needed. For example, a plurality of pages are opened based on one web address and set up as a page group for synchronous updating of the pages. Setting up a single page group including pages corresponding to the same user, such as a user's Qzone pages and the user's microblog pages, is possible, to synchronously place Qzone page signatures and other messages onto the microblog pages. No limit on how the page groups are organized exists.

In some embodiments, since page groups are established based on different desires, the same page can belong to a plurality of page groups. Therefore, the device 1100 further comprises a page group determining unit 1150. The page group determining unit 1150 determines the current page group of the pages based on the attribute information of the data when the pages belong to a plurality of page groups. The data is then transmitted between the pages in the current page group.

In some embodiments, data attribute information corresponds to transmission attribute information for the data. For example, when the data is used to display signature messages in the Qzone and microblogs, the current page group is a page group composed of Qzone and microblog pages. When the data is to be transmitted between same origin pages, the current page group is a page group composed of same origin pages.

The communication unit 1140 establishes communication links between the page and the other pages based on the communication identifiers and uses the communication links to send the data to be transmitted to the other pages.

Many ways in which clients use communication identifiers of pages to establish communication links exist. In some embodiments, pages use inter-page FLASH files to establish communication links between pages.

Figure 12A:
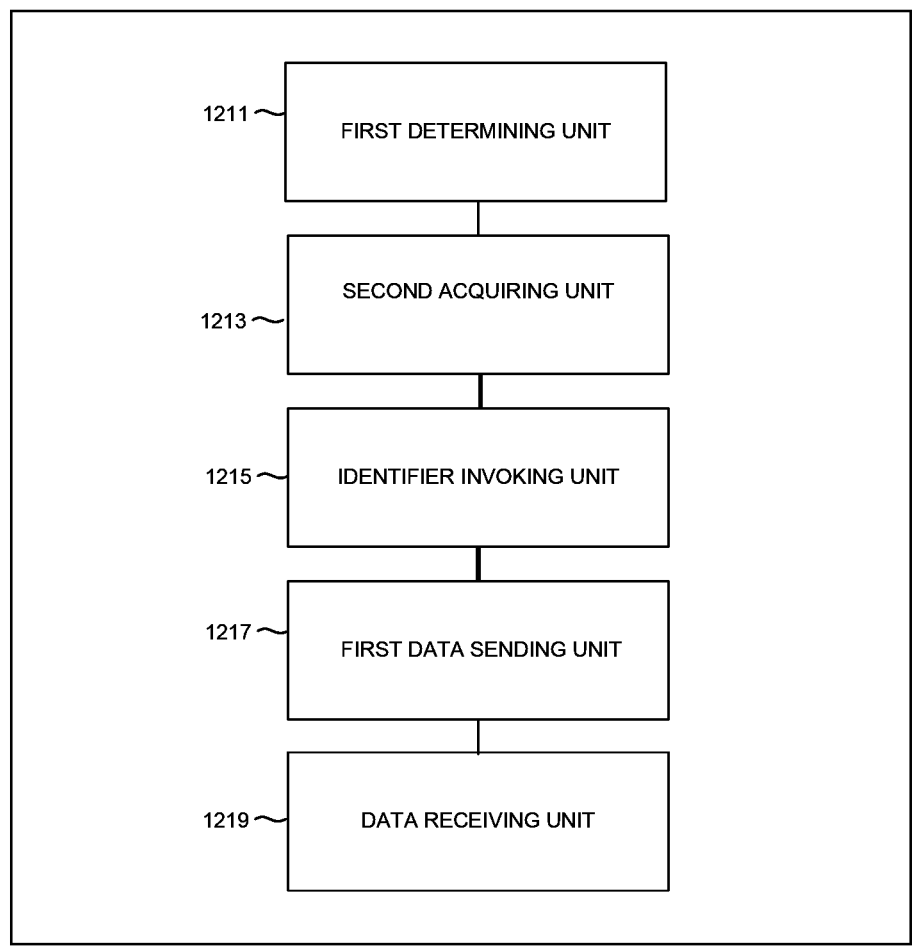
FIG. 12A is a structural diagram of an embodiment of a communication unit.

FIG. 12A is a structural diagram of an embodiment of a communication unit. In some embodiments, the communication unit 1210 is used to implement the communication unit 1140 of the device 1100 and comprises a first determining unit 1211, a second acquiring unit 1213, an identifier invoking unit 1215, a first data sending unit 1217, and a data receiving unit 1219.

The first determining unit 1211 detects whether a page is to conduct data transmissions with another page.

The second acquiring unit 1213 acquires data when the page has data to be transmitted.

The identifier invoking unit 1215 obtains identifiers of other FLASH files in the FLASH group stored in the FLASH area of the page having the data to be transmitted. The FLASH group includes FLASH files corresponding to pages in the current page group and the FLASH area of each page stores the identifiers of other FLASH files in the FLASH group.

The first data sending unit 1217 invokes the FLASH file in the page to send the message receives request including the data to the other FLASH files based on the stored identifiers of the other FLASH files in the FLASH group.

The data receiving unit 1219 invokes the other FLASH files to receive the message receive request and to acquire the data.

In some embodiments, the device 1100 also uses other units in the page with data transmission functions for inter-page transmission of data using the communication identifiers.

In some embodiments, page groups are created in advance. Therefore, the device 1100 further comprises a creating unit 1160. The creating unit 1160 creates page groups.

In some embodiments, page groups are created as needed. For example, a plurality of pages that are opened based on one web address are set up as a page group for synchronous updating of the pages. Setting up a single page group consisting of pages corresponding to the same user, such as a user's Qzone pages and the user's microblog pages, is also possible, so as to synchronously put an Qzone page signature and other messages onto the microblog pages.

Figure 12B:
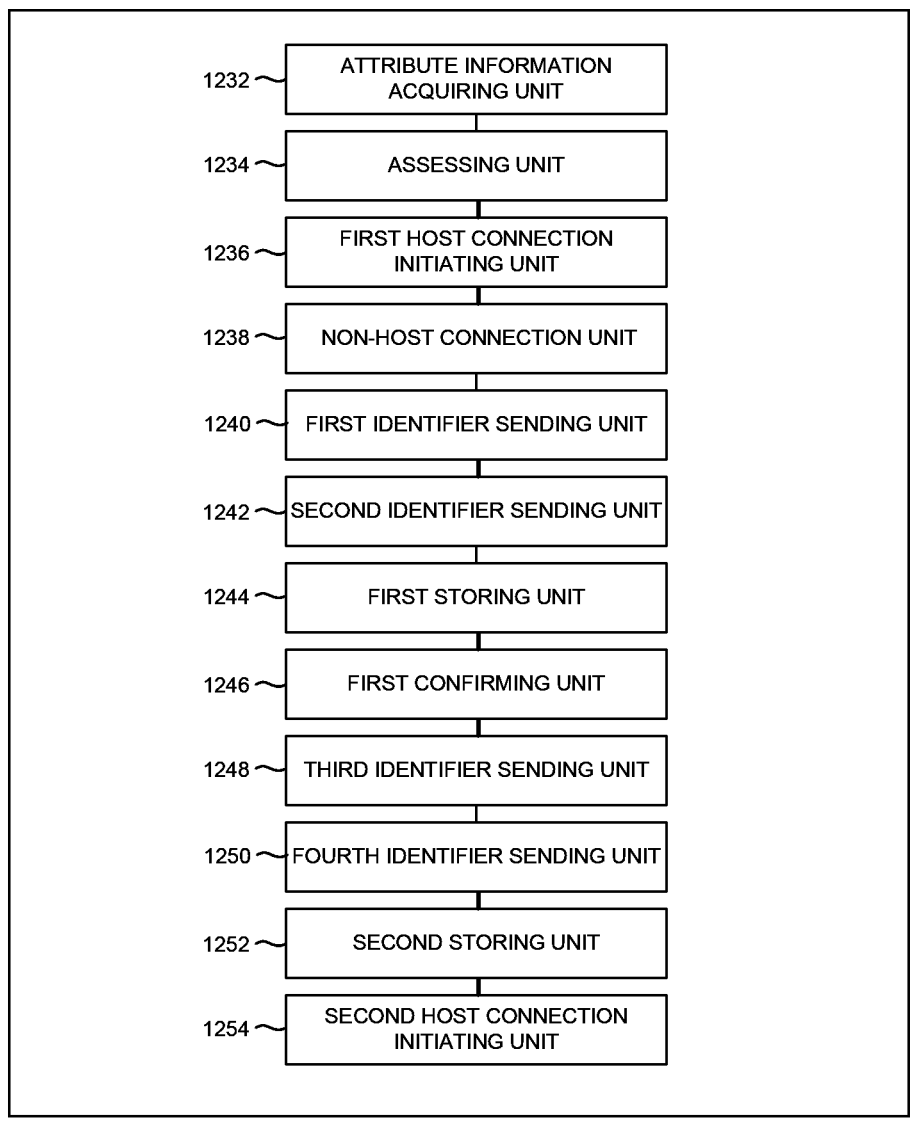
FIGS. 12B-12D are structural diagrams of an embodiment of a device for communicating between pages.
Figure 12C:
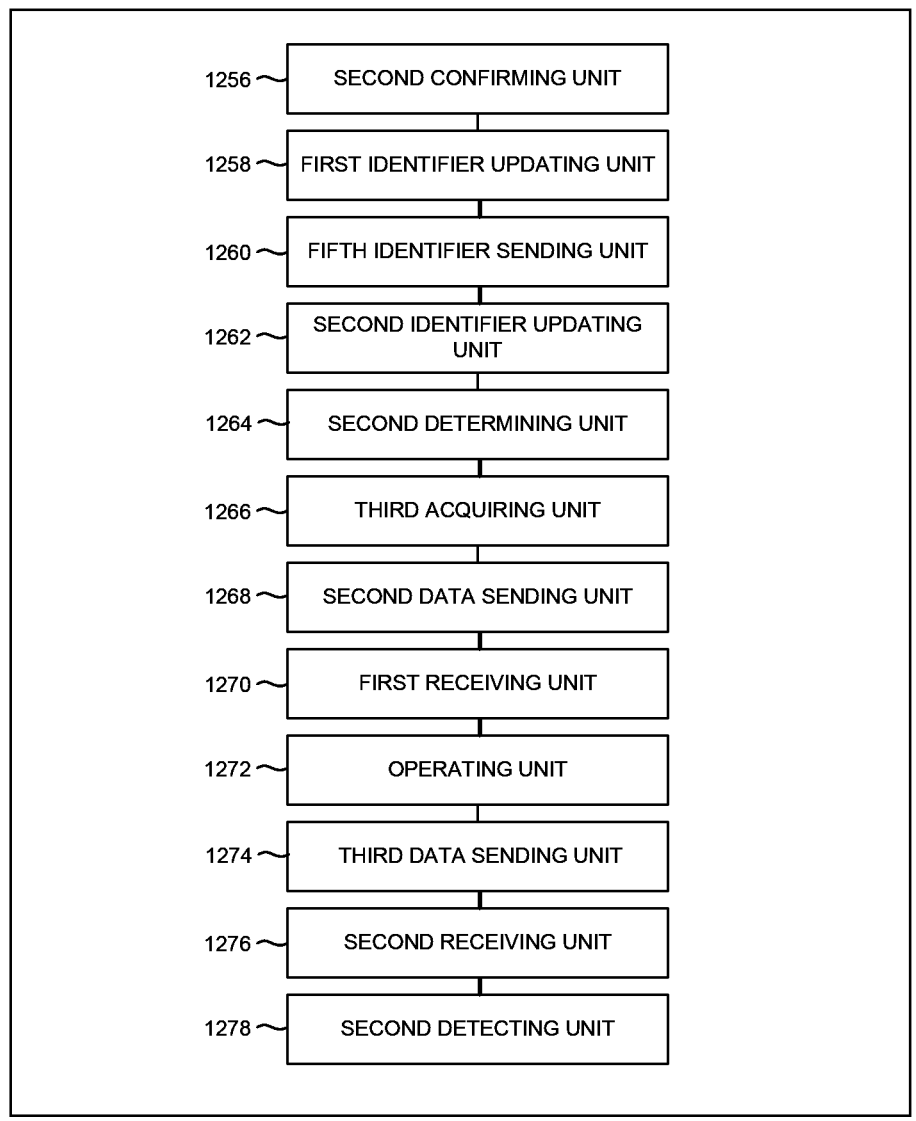
Figure 12D:
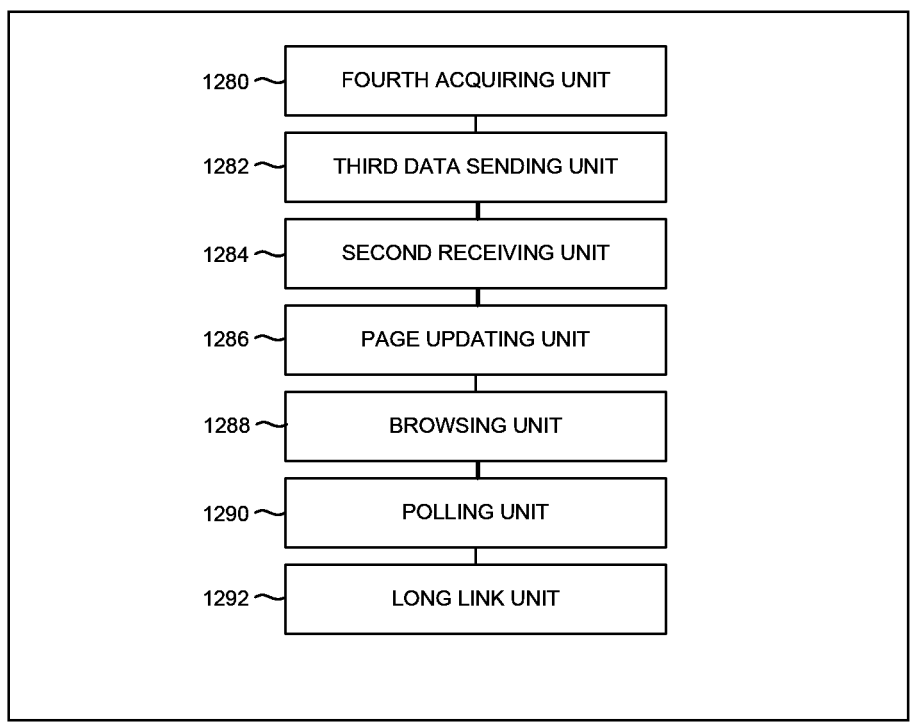

FIGS. 12B-12D are structural diagrams of an embodiment of a device for communicating between pages. The device 1100 comprises an attribute information acquiring unit 1232, an assessing unit 1234, a first host connection initiating unit 1236, a non-host connection unit 1238, a first identifier sending unit 1240, a second identifier sending unit 1242, and a first storing unit 1244.

The attribute information acquiring unit 1232 acquires the attribute information of the current page.

In some embodiments, "current pages" refers to each currently opened page detected by the client. In the event that a page is opened, the attribute information acquiring unit 1232 acquires the attribute information of the page. The "attribute information" refers to information that is used to represent whether the page is to communicate with other pages and what communication need exists for which pages. For example, has the page been set up for synchronous updating with other pages?; has the page been set up for synchronous operation with other pages?; what are the types of data for synchronous updating?; what are the types of operations for synchronous operations?, etc. In some embodiments, the same page is added to a plurality of page groups based on different attributes of the page.

The assessing unit 1234 assesses whether the current page is to be added to a page group based on the attribute information.

For example, if the attribute information indicates that the current page A is to undergo signature message synchronous updating with another page, page B, then the first host connection initiating unit 1236 decides to add the current page A to the corresponding page group.

Please note that synchronous updating between same origin pages is the default requirement of current networks. In other words, each page is to be synchronously updated with other same origin pages. Therefore, each page is to be added to the page group for same origin page synchronous updating.

The first host connection initiating unit 1236 invokes the FLASH file of the current page to initiate an operation to establish a host connection FLASH file when the current page is to be added to the page group.

In some embodiments, the client sets up a plurality of page groups, and differentiating FLASH groups corresponding to page groups is possible by giving the different FLASH groups different names. No restriction to the specific names of the groups given exists. For example, the FLASH groups are called "cloud," "rain," etc. In some embodiments, the same page is added to different page groups. Therefore, the same page has different FLASH files invoking the page. In order to differentiate the FLASH files, each of the various FLASH files for one page is set up based on the FLASH group names. For example, the name of a host connection FLASH file is set up as "FLASH group name_HOST." Thus, the name signifies the FLASH group where the host connection FLASH file is located.

In some embodiments, when a page is launched, the first host connection initiating unit 1236 invokes the "create" interface to initiate an operation that attempts to create a host connection FLASH file. When the FLASH group name is "cloud," the host connection name is "cloud_HOST."

When the host connection FLASH file already exists, the non-host connection unit 1238 invokes adding the FLASH file of the current page to the FLASH group and establishing the current non-host connection FLASH file and at the same time generates and records the current non-host connection identifier.

In some embodiments, only one host connection FLASH file exists. As an aspect, a plurality of non-host connection FLASH files exist. To differentiate the non-host connection FLASH files from each other, unique non-host connection identifiers are generated by the non-host connection unit 1238.

To ensure uniqueness when a non-host connection FLASH file is created, the non-host connection unit 1238 invokes the "join" interface to create a non-host connection FLASH file with the name "FLASH group name_non-host-connection identifier A." In the event that A already exists, an attempt is made to create a non-host connection FLASH file with the name "FLASH group name_non-host-connection identifier B," etc. until the created identifier does not exist in the FLASH group.

In some embodiments, the non-host connection unit 1238 generates non-host connection identifiers randomly. In some embodiments, the non-host connection unit 1238 generates non-host connection identifiers based on a sequence.

The first identifier sending unit 1240 invokes the current non-host connection FLASH file to send the current non-host connection identifier to the host connection FLASH file.

The second identifier sending unit 1242 invokes the host connection FLASH file to store and send the FLASH group identifier to each non-host connection FLASH file in the FLASH group. The FLASH group identifier includes the host connection identifier and each non-host connection identifier.

The first storing unit 1244 invokes the each non-host connection FLASH file to store the FLASH group identifier.

In some embodiments, when the FLASH group includes only the host connection FLASH file and the current non-host connection FLASH file, the FLASH group identifier includes the host connection identifier and the current non-host connection identifier, and "each non-host connection" refers to the current non-host connection FLASH file.

When the FLASH group includes the host connection FLASH file, the current non-host connection FLASH file, and other non-host connection FLASH files, the FLASH group identifier includes the host connection identifier, the current non-host connection identifier, and the non-host connection identifiers of the other non-host connection FLASH files, and "each non-host connection" refers to the current non-host connection FLASH file and the other non-host connection FLASH files.

In some embodiments, the device 1100 further includes a first confirming unit 1246, a third identifier sending unit 1248, a fourth identifier sending unit 1250, and a second storing unit 1252.

When the FLASH group does not have a host connection FLASH file, the first confirming unit 1246 confirms the FLASH file of the current page as the host connection FLASH file, and at the same time generates and records the host connection identifier.

When the FLASH group has at least one non-host connection FLASH file, the third identifier sending unit 1248 invokes each non-host connection FLASH file in the FLASH group to send a non-host connection identifier to the host connection FLASH file.

The fourth identifier sending unit 1250 invokes the host connection FLASH file to send the FLASH group identifier to the each non-host connection FLASH file. The FLASH group identifier comprises the host connection identifier and the non-host connection identifier of the each non-host connection FLASH file.

The second storing unit 1252 invokes the each non-host connection FLASH file to store the FLASH group identifier.

The host connection FLASH file sometimes stops working. For example, when the page corresponding to the host connection FLASH file is closed, the host connection FLASH file disappears with the closed page. When a new non-host connection FLASH file is subsequently established, a situation may arise where joining the FLASH group does not occur. Therefore, to address at least this situation, the device 1100 further comprises a second host connection initiating unit 1254, a second confirming unit 1256, a first identifier updating unit 1258, a fifth identifier sending unit 1260, and a second identifier updating unit 1262.

The second host connection initiating unit 1254 invokes a non-host connection FLASH file in the FLASH group to initiate an operation to re-establish the host connection FLASH file. In some embodiments, the operation is performed in real time. In some embodiments, the operation is performed periodically.

The second confirming unit 1256 confirms, when the host connection FLASH file is invalid, the non-host connection FLASH file whereby the operation to re-establish the host connection FLASH file was initiated as the new host connection FLASH file and at the same time generates and records a new host connection identifier. In some embodiments, the generated new host connection identifier is the same as the original host connection identifier.

The first identifier updating unit 1258 invokes the new host connection FLASH file to update the self-stored FLASH group identifier according to the new host connection identifier. After the new host connection FLASH file is generated, the first identifier updating unit 1258 invokes the new host connection FLASH file to update the group members, deletes the identifier which existed when the new host connection FLASH file was a non-host connection FLASH file, and updates the self-stored FLASH group identifier according to the generated new host connection identifier.

The fifth identifier sending unit 1260 invokes the new host connection FLASH file to send the updated FLASH group identifier to each non-host connection FLASH file in the FLASH group.

The second identifier updating unit 1262 invokes the each non-host connection FLASH file to use the received, updated FLASH group identifier as a basis for updating the FLASH group identifier which was self-stored.

Direct communication between client pages has a plurality of applications. For example, direct communication between the client pages is applied to synchronous updating between pages and synchronous operations between pages, as described below.

When synchronous inter-page operations are implemented based on the direct communication between pages, the device 1100 further comprises a second determining unit 1264, a third acquiring unit 1266, a second data sending unit 1268, a first receiving unit 1270, and an operating unit 1272.

The second determining unit 1264 detects whether a page in a page group has executed a new operation. "New operation" refers to a page related operation (for example, page switching) other than the updating of contents.

The third acquiring unit 1266 acquires operational data used to order the execution of the new page related operation when a page has executed an updating operation.

The second data sending unit 1268 invokes the FLASH file in the page that executed the new operation to send, based on the stored identifiers of other FLASH files in the FLASH group, the message receive request including the operational data to the other FLASH files.

The first receiving unit 1270 invokes the other FLASH files to receive the operational data based on the message receive request.

The operating unit 1272 executes the operation on the corresponding page based on the operational data.

In some embodiments, many ways in which a FLASH file sends a message receive request to the other FLASH files exist, and the other FLASH files receive operational data in accordance with the message receive request. In some embodiments, the device 1100 includes a third data sending unit 1274 and a second receiving unit 1276.

The third data sending unit 1274 and the second receiving unit 1276 use the sendmessage function (send message function) and the receivemessage function (receive message function) in the FLASH file to send and receive messages, respectively.

The third data sending unit 1274 invokes the FLASH file on the page that executed the new operation to use the sendmessage function to send a receivemessage request including the operational data to the other FLASH files.

The second receiving unit 1276 invokes the other FLASH files to use the receivemessage function to receive the receivemessage request and to acquire the operational data included in the receivemessage request.

When synchronous inter-page updating is implemented based on direct communication between pages, the device 1100 comprises a second detecting unit 1278, a fourth acquiring unit 1280, a third data sending unit 1282, a second receiving unit 1284, and a page updating unit 1286.

The second detecting unit 1278 detects whether a page in a page group has implemented an update.

The fourth acquiring unit 1280, when the page has implemented the update, acquires update data from the updated page.

The third data sending unit 1282 invokes the FLASH file in the updated page to send, based on the stored identifiers of other FLASH files in the FLASH group, the message receive request including the update data to the other FLASH files.

The second receiving unit 1284 invokes the other FLASH files to receive the update data based on the message receive request.

The page updating unit 1286 updates the pages corresponding to the other FLASH files based on the update data.

A page in the page group acquires update data and is updated before the updated page is used to transmit the update data to other pages. The updating may be based on many approaches. Accordingly, in some embodiments, the device 1100 further comprises a browsing unit 1288, a polling unit 1290, and a long link unit 1292.

The browsing unit 1288 sets up a browser to acquire update data from a server. Then the update data is sent to at least one page in the browser, with the result that the at least one page is updated. Because this approach involves only one browser, the pages in other browsers are updated based on a direct communication between pages as described above. This approach has the capability of the browser-based localstorage solution to span different browsers during page updating.

The polling unit 1290 sets up a client for periodic page polling and acquiring from the client the update data to implement updating. In this approach, only one page is involved, so while assuring immediacy, the approach also assures page performance. Of course, in some embodiments, the polling unit 1290 also sets up a polling client for an appropriate quantity of pages.

The long link unit 1292 sets up a page server long link and acquires from the server update data to implement updating. Since only one page has a long link with the server, less bandwidth demand on the server exists and thus lower server costs occur. Of course, in some embodiments, the long link unit 1292 also sets up server long links with an appropriate quantity of pages within the server's bandwidth limits.

In some embodiments, the pages in the page group are same origin pages. In some embodiments, the pages in the page group are different origin pages.

In some embodiments, the type of update data to be transmitted varies based on different updating desires. For example, because each update is to be synchronized when synchronous updating is implemented between same origin pages, the "update data" refers to any update data on the page. When only a specific update is to be synchronized, the update data is specific data of a certain type, for example, the aforementioned Qzone and microblog pages of one user. The only thing detected on the page in this case is signature data, and not other data. In the present application, setting up specific types for update data in order to satisfy different updating desires is possible.

In addition, as is the case with synchronous inter-page operations, the page FLASH file uses the sendmessage function and the receivemessage function for sending and receiving update data.

Figure 13:
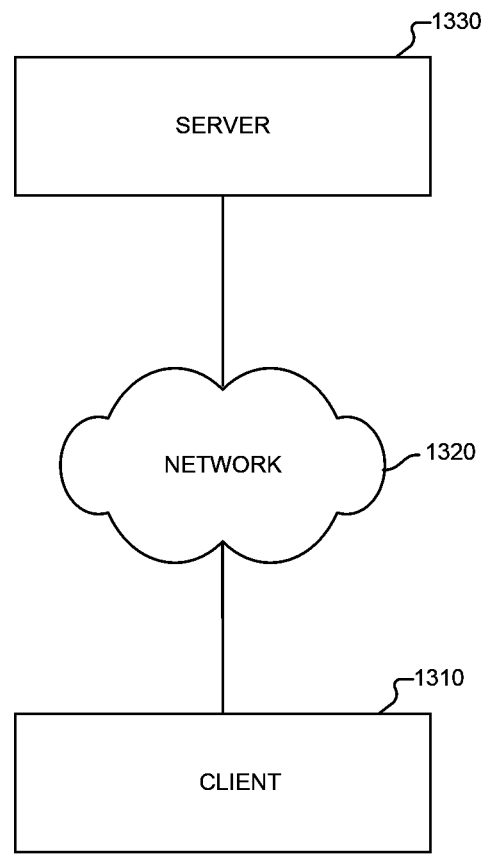
FIG. 13 is a diagram of an embodiment of a communication between pages system.

FIG. 13 is a diagram of an embodiment of a communication between pages system. The system 1300 includes a server 1330 connected via a network 1320 to a client 1310.

The client 1310 receives update data from the server 1330.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices. The functions of the units may be merged into one another or further split into multiple sub-units.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for communicating between pages to be displayed at a client, comprising:
    detecting whether a first page is to transmit data to a second page, comprising:
        determining a current page group of the first page based on attribute information of the data;
    in the event that the first page is to transmit the data to the second page, obtaining a communication identifier of the second page in the current page group storing the first page and the second page, wherein the current page group includes at least two pre-established pages, the communication identifier being allocated to each page in the current page group at the time that the current page group is established, each page in the current page group storing the communication identifier of the second page, wherein the obtaining of the communication identifier of the second page in the current page group storing the first page and the second page comprises:
        obtaining an identifier of another FLASH file in a FLASH group stored in a FLASH area of the first page, the FLASH group comprising FLASH files corresponding to the at least two pages in the current page group, the FLASH area of the first page storing the identifier of the other FLASH file in the FLASH group; and
    establishing a communication link between the first page and the second page based on the communication identifier, comprising:
        invoking a FLASH file in the first page to be sent based on the stored identifier of the other FLASH file in the FLASH group, the invoking of the FLASH file includes sending a message receive request including the data to the other FLASH file; and
        invoking the other FLASH file to receive the message receive request to acquire the data; and
    using the communication link to send the data to be transmitted to the second page.

2. The method as described in claim 1, wherein the establishing of the current page group comprises:

acquiring the attribute information of the data of a current page;

assessing whether the current page is to be added to the current page group based on the attribute information;

in the event that the current page is assessed to be added to the current page group, invoking the FLASH file of the current page to initiate an operation to establish a host connection FLASH file;

determining whether the FLASH group already has the host connection FLASH file;

in the event that the FLASH group has the host connection FLASH file, invoking adding a FLASH file of the current page to the FLASH group and establishing a current non-host connection FLASH file and at the same time generating and recording a current non-host connection identifier;

invoking the current non-host connection FLASH file to send the current non-host connection identifier to the host connection FLASH file;

invoking the host connection FLASH file to store and send FLASH group identifier to each non-host connection FLASH file in the FLASH group, wherein the FLASH group identifier comprises a host connection identifier and the non-host connection identifier; and invoking the non-host connection FLASH file to store the FLASH group identifier.

3. The method as described in claim 2, wherein in the event that the FLASH group does not have a host connection FLASH file:

confirming the FLASH file of the current page as the host connection FLASH file, and at the same time generating and recording the host connection identifier;

in the event that the FLASH group has at least one non-host connection FLASH file, invoking each non-host connection FLASH file in the FLASH group to send a non-host connection identifier to the host connection FLASH file;

invoking the host connection FLASH file to send the FLASH group identifier to the each non-host connection FLASH file, the FLASH group identifier including the host connection identifier and each non-host connection identifier; and invoking the each non-host connection FLASH file to store the FLASH group identifier.

4. The method as described in claim 2, wherein the generating of the current non-host connection identifier comprises generating the current non-host connection identifier randomly or based on a certain sequence.

5. The method as described in claim 2, further comprising:

invoking the non-host connection FLASH file in the FLASH group to initiate an operation to re-establish the host connection FLASH file;

determining whether the host connection FLASH file has become invalid;

in the event that the host connection FLASH file has become invalid, confirming the non-host connection FLASH file whereby the operation to establish the host connection FLASH file was re-initiated as a new host connection FLASH file and at the same time generating and recording a new host connection identifier;

invoking the new host connection FLASH file to update the self-stored FLASH group identifier based on the new host connection identifier and sending the updated FLASH group identifier to the non-host connection FLASH file in the FLASH group; and updating the self-stored FLASH group identifier based on the non-host connection FLASH file to use the updated FLASH group identifier.

6. The method as described in claim 1, further comprising:
executing page-related operations on the second page based on the data, wherein the data is operational data.

7. The method as described in claim 1, further comprising:
updating the second page according to the data, wherein the data is update data.

8. The method as described in claim 1:
wherein the invoking of the FLASH file on the first page to be sent comprises sending the message receive request including the data to the other FLASH file based on the identifier of the other FLASH file in the FLASH group; and wherein the other FLASH file makes use of a receivemessage function to receive the message receive request and to acquire the data.

9. The method as described in claim 1, wherein the pages in the current page group are same origin pages.

10. A system for communicating between pages to be displayed at a client, comprising:

at least one processor configured to:

detect whether a first page is to transmit data to a second page, comprising to:

determine a current page group of the first page based on attribute information of the data;

in the event that the first page is to transmit the data to the second page, obtain a communication identifier of the second page in the current page group storing the first page and the second page, wherein the current page group includes at least two pre-established pages, the communication identifier being allocated to each page in the current page group at the time that the current page group is established, each page in the current page group storing the communication identifier of the second page, wherein the obtaining of the communication identifier of the second page in the current page group storing the first page and the second page comprises to:

obtain an identifier of other FLASH file in a FLASH group stored in a FLASH area of the first page, the FLASH group comprising FLASH files corresponding to the at least two pages in the current page group, the FLASH area of the first page storing the identifier of the other FLASH file in the FLASH group; and establish a communication link between the first page and the second page based on the communication identifier, comprising to:

invoke a FLASH file in the first page to be sent based on the stored identifier of the other FLASH file in the FLASH group, the invoking of the FLASH file includes send a message receive request including the data to the other FLASH file; and invoke the other FLASH file to receive the message receive request to acquire the data and use the communication link to send the data to be transmitted to the second page; and a memory coupled to the at least one processor and configured to provide the at least one processor with instructions.

11. The system as described according to claim 10, wherein the establishing of the current page group comprises:

acquire the attribute information of the data a current page;

assess whether the current page is to be added to the current page group based on the attribute information;

in the event that the current page is assessed to be added to the current page group, invoke the FLASH file of the current page to initiate an operation to establish a host connection FLASH file;

determine whether the FLASH group already has the host connection FLASH file;

in the event that the FLASH group has the host connection FLASH file, invoke adding FLASH file of the current page to the FLASH group and establish a current non-host connection FLASH file and at the same time generate and record a current non-host connection identifier;

invoke the current non-host connection FLASH file to send the current non-host connection identifier to the host connection FLASH file;

invoke the host connection FLASH file to store and send FLASH group identifier to each non-host connection FLASH file in the FLASH group, wherein the FLASH group identifier comprises a host connection identifier and the non-host connection identifier; and invoke the non-host connection FLASH file to store the FLASH group identifier.

12. The system as described in claim 11, wherein in the event that the FLASH group does not have a host connection FLASH file:

confirm the FLASH file of the current page as the host connection FLASH file, and at the same time generate and record the host connection identifier;

in the event that the FLASH group has at least one non-host connection FLASH file, invoke each non-host connection FLASH file in the FLASH group to send a non-host connection identifier to the host connection FLASH file;

invoke the host connection FLASH file to send the FLASH group identifier to the each non-host connection FLASH file, the FLASH group identifier including the host connection identifier and each non-host connection identifier; and invoke the each non-host connection FLASH file to store the FLASH group identifier.

13. The system as described in claim 11, wherein the generating of the current non-host connection identifier comprises generate the current non-host connection identifier randomly or based on a certain sequence.

14. The system as described in claim 11, wherein the processor is further configured to:

invoke the non-host connection FLASH file in the FLASH group to initiate an operation to re-establish the host connection FLASH file;

determine whether the host connection FLASH file has become invalid;

in the event that the host connection FLASH file has become invalid, confirm the non-host connection FLASH file whereby the operation to establish the host connection FLASH file was re-initiated as a new host connection FLASH file and at the same time generate and record a new host connection identifier;

invoke the new host connection FLASH file to update the self-stored FLASH group identifier based on the new host connection identifier and send the updated FLASH group identifier to the non-host connection FLASH file in the FLASH group; and update the self-stored FLASH group identifier based on the non-host connection FLASH file to use the updated FLASH group identifier.

15. The system as described in claim 10, wherein the processor is further configured to:

execute page-related operations on the second page based on the data, wherein the data is operational data.

16. The system as described in claim 10, wherein the at least one processor is further configured to:

update the second page according to the data, wherein the data is update data.

17. The system as described in claim 10:

wherein the invoking of the FLASH file on the first page to be sent comprises send the message receive request including the data to the other FLASH file based on the identifier of the other FLASH file in the FLASH group; and wherein the other FLASH file makes use of a receivemessage function to receive the message receive request and to acquire the data.

18. The system as described in claim 10, wherein the pages in the current page group are same origin pages.

19. A computer program product for communicating between pages to be displayed at a client, the computer program product being embodied in a non-transitory computer readable storage medium and comprising computer instructions for:

detecting whether a first page is to transmit data to a second page, comprising:

determining a current page group of the first page based on attribute information of the data in the event that the first page is to transmit the data to the second page, obtaining a communication identifier of the second page in the current page group storing the first page and the second page, wherein the current page group includes at least two pre-established pages, the communication identifier being allocated to each page in the current page group at the time that the current page group is established, each page in the current page group storing the communication identifier of the second page, wherein the obtaining of the communication identifier of the second page in the current page group storing the first page and the second page comprises:

obtaining an identifier of another FLASH file in a FLASH group stored in a FLASH area of the first page, the FLASH group comprising FLASH files corresponding to the at least two pages in the current page group, the FLASH area of the first page storing the identifier of the other FLASH file in the FLASH group; and establishing a communication link between the first page and the second page based on the communication identifier, comprising:

invoking a FLASH file in the first page to be sent based on the stored identifier of the other FLASH file in the FLASH group, the invoking of the FLASH file includes sending a message receive request including the data to the other FLASH file; and invoking the other FLASH file to receive the message receive request to acquire the data; and using the communication link to send the data to be transmitted to the second page.

* * * * *